(12) United States Patent
Brossman et al.

(10) Patent No.: US 7,022,272 B2
(45) Date of Patent: Apr. 4, 2006

(54) MECHANICAL EMBOSSING TEXTURE DIFFERENTIATION BETWEEN CHEMICALLY RESTRICTED AREAS AND NON-RESTRICTED AREAS

(75) Inventors: W. Craig Brossman, Terre Hill, PA (US); Steven F. Hynicka, Lancaster, PA (US); Lisa Moyer, Lititz, PA (US); William J. Kauffman, Manheim, PA (US)

(73) Assignee: AWI Licensing Company, Wilmington, DE (US)

( * ) Notice: Subject to any disclaimer, the term of this patent is extended or adjusted under 35 U.S.C. 154(b) by 333 days.

(21) Appl. No.: 10/405,692

(22) Filed: Apr. 2, 2003

(65) Prior Publication Data

US 2003/0173696 A1    Sep. 18, 2003

Related U.S. Application Data

(63) Continuation of application No. 09/789,172, filed on Feb. 20, 2001, now Pat. No. 6,613,256.

(51) Int. Cl.
    *B29C 44/06* (2006.01)
    *B29C 59/02* (2006.01)

(52) U.S. Cl. .................. 264/46.4; 156/78; 156/79; 156/209; 264/45.8; 264/46.5; 264/52; 264/293; 264/327

(58) Field of Classification Search .................. 156/78, 156/79, 209; 264/45.8, 46.4, 46.5, 52, 293, 264/327
    See application file for complete search history.

(56) References Cited

U.S. PATENT DOCUMENTS

| | | | |
|---|---|---|---|
| 3,293,094 A | 12/1966 | Naim et al. | 156/79 |
| 3,741,851 A | 6/1973 | Erb et al. | 429/161 |
| 3,887,678 A | 6/1975 | Lewicki, Jr. | 264/284 |
| 3,978,258 A | 8/1976 | Faust et al. | 428/159 |
| 4,022,643 A | 5/1977 | Clark | 156/78 |
| 4,070,435 A | 1/1978 | Lewicki, Jr. et al. | 264/284 |
| 4,100,318 A | 7/1978 | McCann et al. | 428/159 |
| 4,158,070 A | 6/1979 | Lewicki, Jr. et al. | 427/8 |
| 4,158,073 A | 6/1979 | Schneider et al. | 427/195 |
| 4,214,028 A | 7/1980 | Shortway et al. | 428/159 |
| 4,407,882 A | 10/1983 | Hauser et al. | 428/159 |
| 4,617,222 A | 10/1986 | Courtoy et al. | 428/142 |
| 4,756,951 A | 7/1988 | Wang et al. | 428/204 |
| 4,844,849 A | 7/1989 | Miller et al. | 264/46.4 |
| 5,336,693 A | 8/1994 | Frisch | 521/72 |
| 5,458,953 A | 10/1995 | Wang et al. | 428/195 |
| 5,961,903 A * | 10/1999 | Eby et al. | 264/46.5 |

(Continued)

FOREIGN PATENT DOCUMENTS

GB    1422142    1/1976

(Continued)

OTHER PUBLICATIONS

Biscayne Product Catalog, Biscayne Decorative Products.

(Continued)

*Primary Examiner*—Allan R. Kuhns

(57) ABSTRACT

Disclosed is a method of manufacturing a mechanically and chemically embossed surface covering having selectively textured surfaces. The method includes forming a web coated with a wear layer. The coated web is heated to a temperature at which the wear layer is cured, the foam layer expands, and the pattern is chemically embossed to form a surface covering having foamed regions and nonfoamed regions. The temperature gradient of the surface covering is adjusted such that there is a temperature gradient difference between the foamed and nonfoamed regions. A surface texture is then mechanically embossed into the wear layer and selectively set onto the wear layer substantially overlying the non-foamed regions.

30 Claims, 4 Drawing Sheets

U.S. PATENT DOCUMENTS 6,613,256 B1 * 9/2003 Brossman et al. ......... 264/46.4

FOREIGN PATENT DOCUMENTS

| | | |
|---|---|---|
| JP | 63-33430 | 2/1988 |
| JP | 1-110123 | 4/1989 |
| JP | 8-244060 | 9/1996 |

OTHER PUBLICATIONS

Domco Aquaflor II Products, Domco Industries Limited, Montreal, QC.
Toli Catalog Excerpts.

* cited by examiner

MECHANICAL EMBOSSING TEXTURE DIFFERENTIATION BETWEEN CHEMICALLY RESTRICTED AREAS AND NON-RESTRICTED AREAS

CROSS REFERENCE TO RELATED APPLICATION

This application is a continuation of application Ser. No. 09/789,172, filed on Feb. 20, 2001 now U.S. Pat. No. 6,613,256.

FIELD OF THE INVENTION

The present invention relates generally to surface coverings. In particular, the invention relates to a mechanically and chemically embossed surface covering having a selectively textured surface.

BACKGROUND

Decorative laminate surface coverings can be formed into sheets or individual tiles. Typically, in the manufacture of a resilient floor covering, a wear layer is combined with a substrate and resin to form the resilient sheet or tile. The substrate usually comprises a felted or matted fibrous sheet of overlapping, intertwined filaments or fibers. A substantially uniform layer of a liquid or semi-liquid resinous composition containing a synthetic polymeric material, usually an ungelled polyvinyl chloride plastisol and a blowing or foaming agent is typically applied to the substrate. The liquid or semi-liquid plastisol vinyl resin composition is subsequently firmed or gelled at an elevated temperature. This gelled plastisol may be printed with a decorative pattern or design having a blowing or foaming inhibitor for chemically embossing the substrate.

Decorative laminate surface coverings are often designed to have textured surfaces patterned to duplicate a look of actual wood, tile, brick, stone, and other such products. Typically, the texture is either mechanically embossed by pressing a pattern into the surface covering or chemically embossed by using foam retarding agents to restrict expansion of a foamable layer in specific regions of the design. Although these methods provide attractive decorative surface coverings, they are limited in their capability to replicate the appearance of the actual product.

There continues to be a demand by consumers for surface coverings that have a "more realistic" appearance to the natural product. U.S. Pat. No. 5,961,903 describes one method of manufacturing an embossed resinous foam product which is both chemically and mechanically embossed, and includes forming a foamable, resinous composition which contains a blowing agent. An ink composition having a blow modifying agent/retarder is printed onto the foamable, resinous composition. A wear layer is applied and the wear layer/foamable composition is heated to expand the foam and cure the wear layer. Areas of the foam printed with the printing ink composition are restricted from expanding resulting in a chemically embossed product. The chemically embossed structure is cooled to ambient temperature before any further handling. Thereafter, the chemically embossed product is reheated and a texture is mechanically embossed, using an overall textured embossing roll, into the hot wear layer overlying the non-restricted/up foam regions by pressure while it is relatively soft, plastic, and moldable. After the foam is mechanically embossed and has cooled to ambient temperature, a wear layer is coated and cured onto the chemically and mechanically embossed foam.

An alternative method for making a chemically and mechanically embossed surface covering (Armstrong U.S. Ser. No. 09/770,582 incorporated in by reference), includes coating a backing layer with a foamable layer, and adding a print layer to it. The print layer forms a design and a portion of the design is formed with a retarder composition. A thermoplastic wear layer is applied onto the print layer and cured by heat at a temperature sufficiently high enough to expand the foamable layer. The areas of the design layer where the retarder composition is applied are also chemically embossed during such curing. In a continuous process and without cooling to ambient conditions, the temperature of the cured thermoplastic wear layer is adjusted by heating, and the wear layer is then mechanically embossed to have a surface texture in the wear layer overlying the unrestricted/up areas. Optionally, a top coat can be applied to the wear layer before curing and expanding the foam, and the top coat can be mechanically embossed.

Despite existing methods of making chemically and mechanically embossed surface coverings, there is a need for a surface covering having a chemically embossed foam layer and a selectively textured top coat wear layer for simulating a natural product.

SUMMARY

Briefly described, the present invention comprises a method of manufacturing a mechanically and chemically embossed surface covering. In one embodiment of the present method, a mechanically and chemically embossed surface covering is made comprising forming a web having a substrate, an expandable foam layer, and at least one inhibitor/retarder or activator composition disposed as a pattern proximate the foam layer. The web is coated with a wear layer to form a coated web. The coated web is heated to a temperature at which the wear layer is cured, the foam layer expands, and the pattern is chemically embossed to form a surface covering having foamed regions and non-foamed or restricted regions. The temperature gradient of the surface covering is adjusted such that there is a difference between the foamed and non-foamed regions. At least one surface texture is mechanically embossed onto the wear layer with the surface texture being predominantly set onto the wear layer, which substantially overlies the nonfoamed regions.

In greater detail, the surface covering is subjected to an overall textured mechanical embossing roll nip. In one embodiment the embossing roll can have two or more different textures. The temperature gradient is adjusted such that the wear layer over the nonfoamed or restricted regions is mechanically textured, and the wear layer over the foamed regions is substantially non-textured. The surface texture is set into the wear layer residing predominantly over the nonfoamed regions.

Another aspect of the present invention relates to a method of manufacturing a mechanically and chemically embossed surface covering comprising a top coat. The method includes forming a web comprising a substrate, a curable wear layer, and an expandable foam layer between the substrate and the wear layer. Additionally, at least one inhibitor or activator composition is disposed on the covering as a pattern proximate the foam layer. The wear layer of the web is coated with a cross-linkable top coat to form a top coated web. The top coated web is heated to a temperature at which the top coat is substantially cross-linked and cured, the wear layer is cured, the foam layer expands, and the pattern is chemically embossed to form a surface covering having foamed and nonfoamed regions. The temperature gradient of the surface covering is adjusted such that there is a difference between the foamed and non-foamed regions. At least one surface texture is mechanically embossed onto the wear layer and the surface texture is predominantly set into the wear layer substantially overlying the nonfoamed regions.

A further aspect of the present invention relates to a method of manufacturing a mechanically and chemically embossed surface covering by back heating the covering. The method includes forming a web comprising a substrate, an expandable foam layer, and at least one inhibitor composition disposed as a pattern proximate the foam layer, and coating the web with a wear layer to form a coated web. The coated web is then heated to a temperature at which the wear layer is cured, the foam layer expands, and the pattern is chemically embossed to form a surface covering having foamed regions and nonfoamed or restricted regions. Heat is then applied to the substrate side of the surface covering or the backside of the covering. The resulting face temperature of the substrate side is greater than that of the wear layer. At least one surface texture is mechanically embossed onto the wear layer. The surface texture is set into the wear layer areas residing predominantly over the nonfoamed or restricted regions of the surface covering.

Furthermore, there is included a chemically and mechanically embossed surface covering. The surface covering comprises a substrate and a foam layer disposed on the substrate. The foamed layer has a chemically embossed pattern having foamed regions and non-foamed or restricted regions imposed thereon. "Foamed regions" correspond to "up areas" of the chemical embossing, and the "non-foamed regions" correspond to the "down areas" of the chemical embossing. Although no foaming is preferred in the "down areas" to impart the deepest chemical embossing effect, some amount of foaming (partial foaming) may occur in the "non-foamed regions" dependent upon chemical embossing conditions. Therefore, "non-foamed regions" also include partial foamed regions as long as they impart a chemical embossing effect. A wear layer is disposed on the foamed layer, and a surface texture mechanically embossed and selectively set into the wear layer areas residing predominantly over the non-foamed or restricted regions.

DETAILED DESCRIPTION

Figure 1:
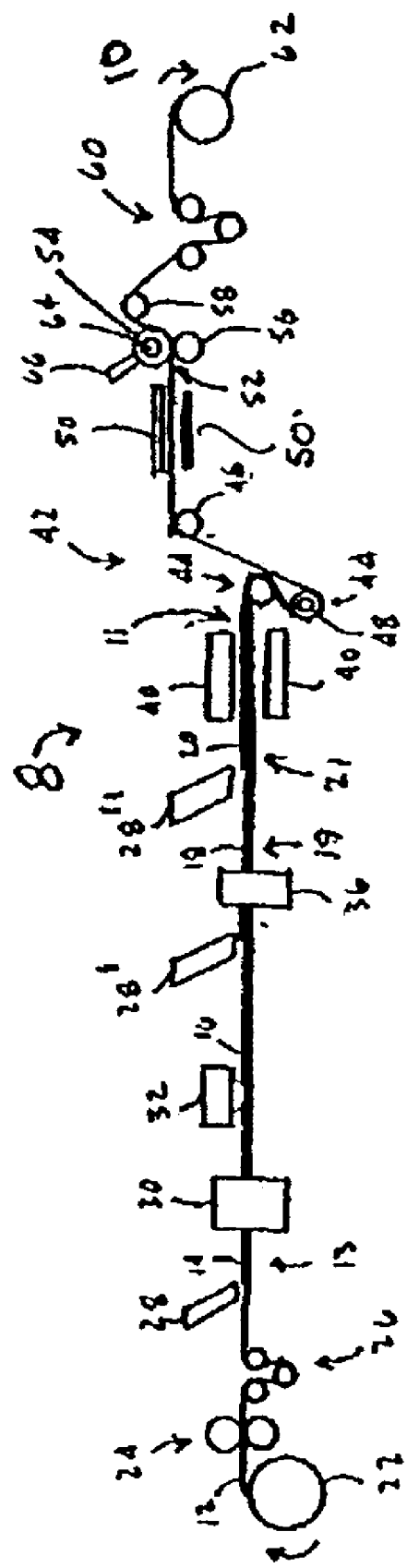
FIG. 1 is a schematic view of an embodiment of a process of manufacturing a mechanically and chemically embossed surface covering.
Figure 2:
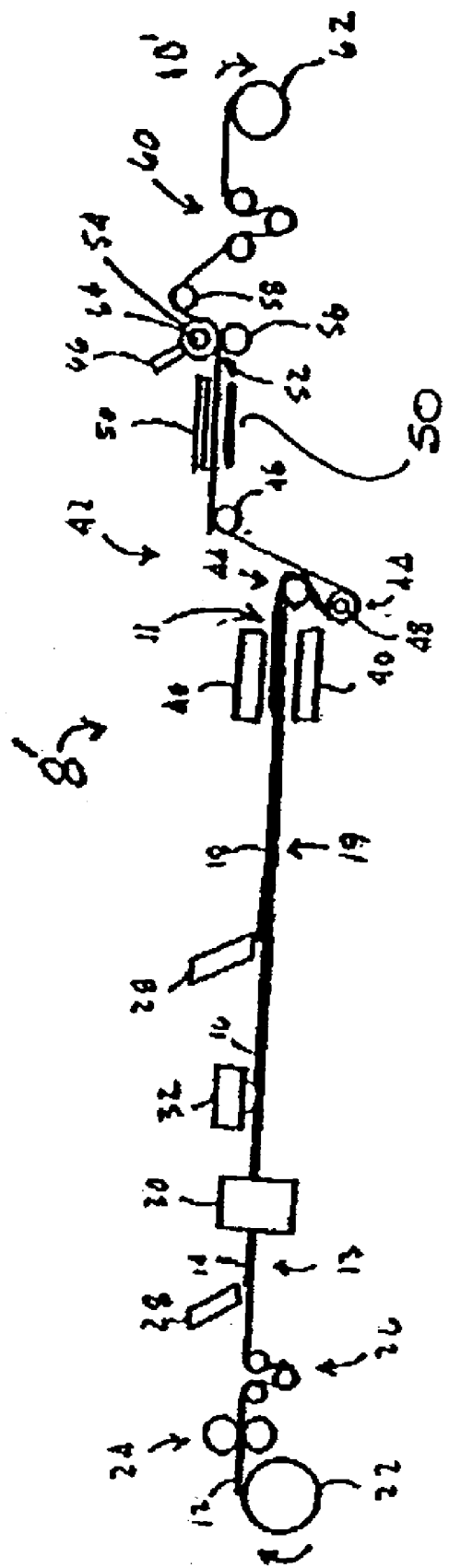
FIG. 2 is a schematic view of another embodiment of a process of manufacturing a mechanically and chemically embossed surface covering of the present invention.

The present invention comprises a method of manufacturing a mechanically and chemically embossed surface covering. The method of manufacturing a mechanically and chemically embossed surface covering can comprise forming a web having a substrate, an expandable foam layer, and at least one inhibitor/retarder or activator composition disposed as a pattern proximate the foam layer. The web may be coated with a wear layer to form a coated web. Additionally, a top coat may also be added. The coated web is heated to a temperature at which the wear layer is cured, the foam layer expands, and the pattern is chemically embossed to form a surface covering having foamed and nonfoamed regions. The temperature gradient of the surface covering is adjusted such that there is a difference between the foamed and non-foamed regions. At least one surface texture is mechanically embossed onto the wear layer with the surface texture being predominantly set onto the wear layer, which substantially overlies the nonfoamed regions.

Additionally, after adjusting the temperature gradient of the surface covering, the covering is then subjected to an overall textured mechanical embossing roll nip which can have regions of more than one texture. The temperature gradient is adjusted such that the wear layer over the nonfoamed or restricted regions is mechanically textured, and the wear layer over the foamed regions is substantially non-textured. The surface texture is set onto the wear layer residing predominantly over the nonfoamed regions.

In another embodiment, the temperature gradient is adjusted so that the embossing texture is predominately set onto the wear layer overlying the unfoamed regions and partially set into the wear layer overlying the foamed regions.

In yet another embodiment, the temperature gradient can be adjusted, and an embossing roll with at least two regions of different texture can be used to set a first texture into the wear layer overlying the nonfoamed regions and a second texture into the wear layer overlying the foamed regions.

Additionally, in another embodiment, the chemical embossed surface covering having mechanical embossing set predominately into the wear layer overlying the unfoamed regions can be reheated, temperature gradients adjusted, and a second embossing texture set predominately into the wear layer overlying the foamed regions. In fact, we have discovered that temperature gradients can be controlled that allows the wear layer overlying the foamed and non-foamed regions to be independently predominately textured. For example, the wear layer overlying the foamed regions can be predominately textured first, and subsequently the wear layer overlying the unfoamed regions can be predominately textured.

The temperature gradient is the rate of change in temperature from top to bottom within the surface covering. For example, if the surface covering is sliced 1 mil at a time, each 1 mil layer would have a temperature. This difference between the temperature of each slice would be the rate of change of temperature (or temperature gradient) for that region. Alternatively, the temperature gradient may be described as a temperature profile from top to bottom in the specific regions of the surface covering. The specific regions may include the foamed and unfoamed regions of the surface covering.

In the case where the embossed texture is set into the wear layer or top coat, the temperature gradient or profile of the surface covering is such that when the wear layer/top coat comes in contact with the embossing roll it can cool quickly and "set" the embossing. If the temperature of the surface is higher than the back temperature, there is a temperature gradient through the sample due to thermal conductivity and heat capacity of the materials (heat flow). In this case, the heat flow (temperature gradient/profile) would be from face to back. If the temperature is higher on the back, then the heat flow (temperature gradient/profile) would be from back to face.

"Foamed regions" correspond to "up areas" of the chemical embossing, and the "non-foamed regions correspond to the "down areas" of the chemical embossing. Although no foaming is preferred in the "down areas" to impart the deepest chemical embossing effect, some amount of foaming (partial foaming) may occur in the "non-foamed regions" dependent upon chemical embossing conditions. Therefore, "non-foamed regions" also include partial foamed regions as long as they impart a chemical embossing effect.

The present method provides for the creation of low gloss/textured grout (nonfoamed or restricted) regions, a higher gloss, and lightly textured or untextured up regions (foamed regions). The mechanical embossing texture is substantially set into the wear layer or top coat overlying the nonfoamed or restricted portions of the surface covering. In contrast, the embossing texture is not substantially set into the wear layer or top coat overlying the foamed portions of the surface covering coating.

Additionally, the areas which are highly textured have a lower gloss value than those which have very little texturing set into the coating layer. Although not wishing to be bound by any one theory, it is believed that this differential texturing is essentially accomplished through creating a different temperature or heat capacity gradient on the surface and within the surface covering. The thermal insulation capabilities of the foam (up regions), versus the nonfoamed or restricted regions (down areas) provide for different heating and cooling rates due to heat capacity differences. This temperature and heat capacity gradient affects not only the embossability property of the wear layer or top coat, but also affects the ability to "set" the embossing texture into the wear layer or top coat once formed under the process conditions.

In one embodiment, heating can occur mainly from the bottom (back) of the substrate. In this case, the thermal insulation capabilities of the foamed (up regions), versus the nonfoamed regions (down areas) allows the wear layer overlying the non-foamed regions to reach embossing temperature before the wear layer overlying the foamed regions. Additionally, the thermal insulating properties of the foamed regions versus the non-foamed or restricted regions also effects the rate of cooling and "set" of the mechanical embossing texture. This results in a flooring product that has a selectively textured and differentially low glossed appearance, which creates a more appealing natural visual.

Additionally, in an embodiment a hot drum is used to effectively transfer the heat from the back of the covering, and emboss the surface covering while it is in contact with the heated drum.

Furthermore, in an additional embodiment the temperature gradient of the surface covering is adjusted for achieving the selective texturing by increasing the line speed of a continuous laminate process. The method can result in grout lines being selectively textured. In this method there is little or no heat loss in the face (wear layer) overlying the grout regions since they make little to no contact with the "tempering rolls". Additionally, when the line speed is increased in a continuous process, the difference in thermal gradient (back to face) is such that the gradient (high backside temperature and heat capacity) can be the controlling factor.

Figure 3:
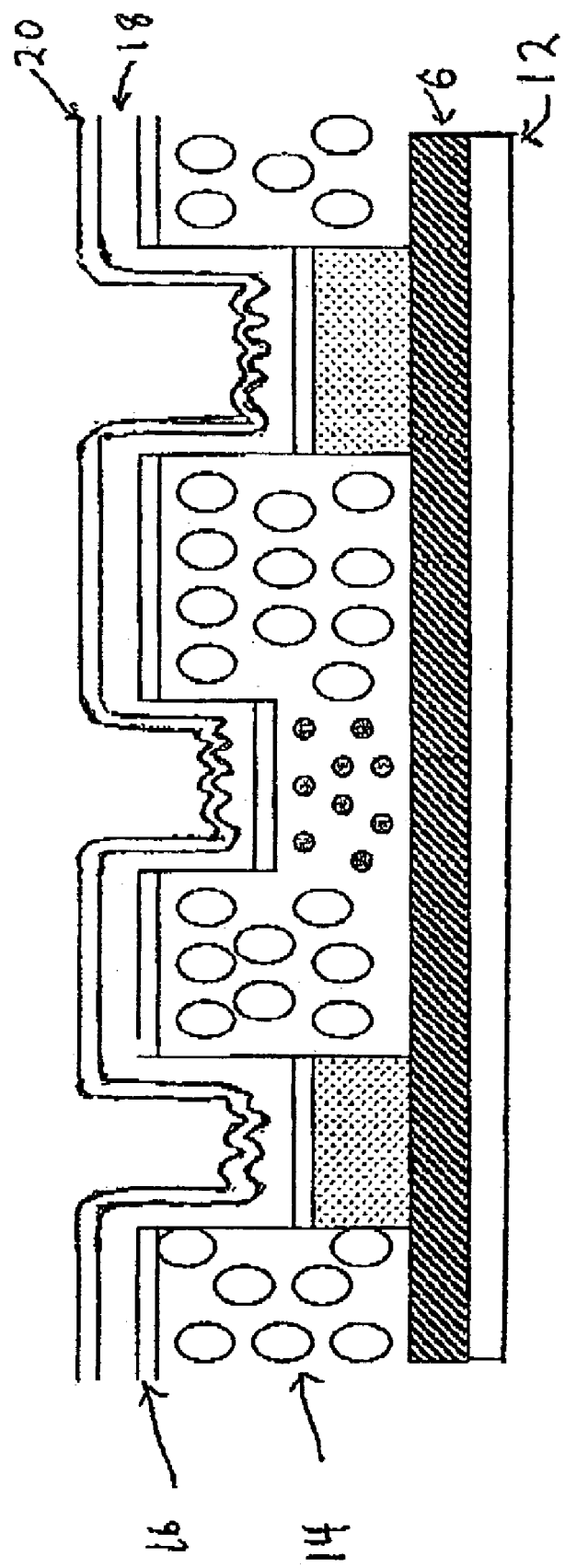
FIG. 3 is a partial cross sectional and elevation view of an embodiment of a mechanically and chemically embossed surface covering made in accordance with the process of FIG. 1.
Figure 4:
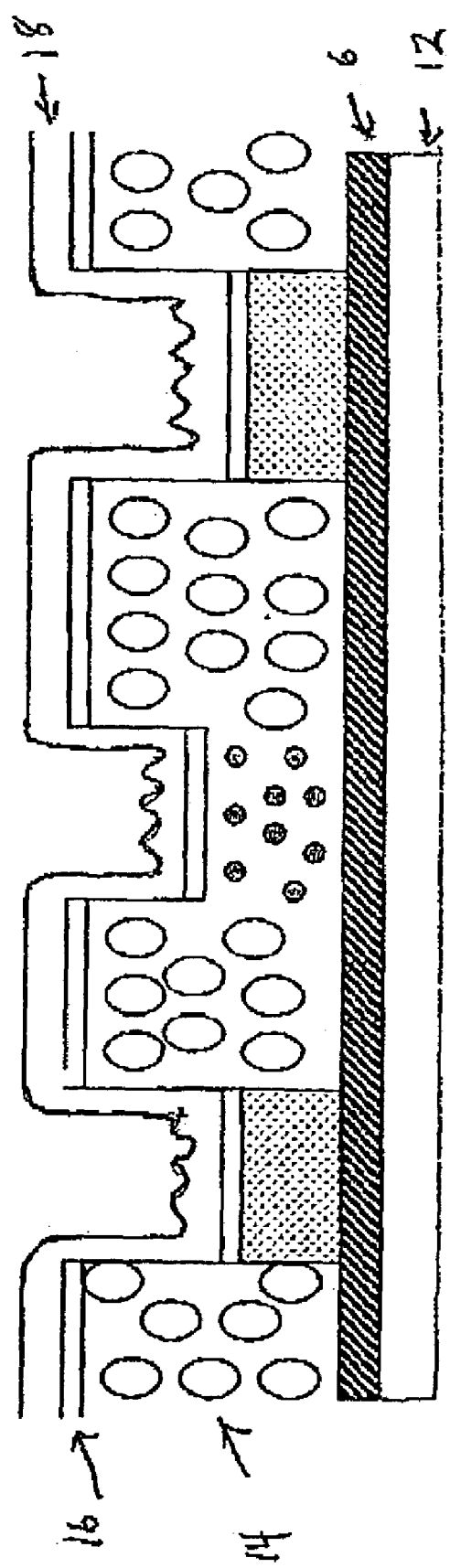
FIG. 4 is a partial cross sectional and elevation view of an embodiment of a mechanically and chemically embossed surface covering made in accordance with the process of FIG. 2.

Generally, the mechanical and chemical embossing process is illustrated in FIGS. 1 and 3. As illustrated, a web 19 is formed comprising a substrate 12, a curable wear layer 18, an expandable foam layer 14 between the substrate 12 and the wear layer 18, and at least one inhibitor composition disposed as a pattern proximate the foam layer 14. The wear layer 18 is coated with a cross-linkable top coat 20 to form a coated web 21 and then heated to a temperature at which the top coat 20 is substantially cross-linked and cured, the wear layer 18 is substantially cured, the foam layer 14 substantially expands, and the pattern is chemically embossed to form a surface covering 11. Thereafter, the surface covering 11 is tempered to a temperature generally above ambient temperature. The top coat 20 is then heated if required, and at least one surface texture is mechanically embossed onto the top coat 20. Upon setting the surface texture, the mechanically and chemically embossed surface covering 10 is formed. In addition, mechanical embossing includes mechanical embossing in register with a printed or chemically embossed pattern of the surface covering 11.

The expandable foam layer 14 comprises a resinous composition containing a chemical blowing agent and is applied to a surface of the substrate 12 to form a coated substrate 13. Preferably, the expandable foam layer 14 has a substantially uniform thickness. The expandable foam layer 14 is coated onto the substrate 12 by any suitable conventional coating apparatus 28 such as a reverse roll coater, a doctor blade, an air knife, or other similar coating apparatus. The coated substrate 13 is then passed through a heating unit 30 which supplies sufficient heat to at least partially gel or solidify the thermoplastic resinous coating without decomposing the blowing agent. Any conventional heating unit such as a bank of radiant heaters, an oven, a heated drum, and the like may be utilized. Depending upon the material, the foamable layer can also be produced by melt processing techniques such as calendering or extrusion.

The gelled foam layer 14 and substrate 12 may then be passed to a printing unit 32 which places the print layer 16 preferably comprising a printing ink composition onto the gelled foam layer 14. Any conventional printing apparatus such as a silk screen apparatus, a flat bed printing machine, an ink jet printer, or a conventional gravure or rotogravure press which is etched to print a design with a suitable ink can be utilized to print on the surface of the gelled foam layer 14. The print layer 16 is conventionally dried in the printing unit 32. One or more of the printing ink compositions, which may be either pigmented or transparent, contains an inhibitor or an activator for the blowing agent in the foamable layer 14. Further, concentrations of inhibitor or accelerator can differ from one printing ink composition to another. Accordingly, the print layer 16 can be printed wherein the printing ink and inhibitor or accelerator composition vary from one portion or area to another.

Alternatively, or in addition to the inhibitor or accelerator present in the print layer 16, the inhibitor or accelerator can be printed or otherwise applied to the substrate 12 and then the foam layer 14 applied over the inhibitor or accelerator. Accordingly, the inhibitor or accelerator composition can be a pigmented composition. For example, the printing ink composition can be visible from the surface of the mechanically and chemically embossed surface covering 10. The pigmented composition is visible if substantially complete inhibition of the blowing agent is obtained, and the non-foam areas of the foam layer 14 and any subsequent layers disposed thereon are at least translucent or substantially clear.

The wear layer 18 comprises a coat of a resinous composition, such as a polyvinyl chloride plastisol or organosol, and is applied over the print or foam layers 16, 14 by another conventional coating apparatus 28 such as a reverse roll coater, a doctor blade, an air knife, or other similar coating apparatus. Optionally, the wear layer can also comprise melt processable composition such as general purpose, polyvinyl chloride, polyolefin, or other polymers that can be applied by calendering or extrusion, or laminating to the foamable layer. Preferably, the wear layer 18 has a substantially uniform thickness across the coated substrate 13. The wear layer 18 is preferably transparent, but can be translucent or pigmented opaque. If the wear layer 18 is opaque, the inks will not be visible from the surface of the mechanically and chemically embossed surface covering 10. After applying the wear layer 18, the composite structure is passed through another heating unit 36 which supplies sufficient heat to at least partially gel the wear layer 18 (if necessary) without decomposing the blowing agent to form a web 19. Again, any conventional heating unit such as a bank of infrared heating lamps, an oven, a heated drum, and the like may be utilized. Thereafter, a print layer 16 can be optionally printed onto the gelled wear layer 18 in addition to, or as an alternative to, the print layer 16 on the foam layer 14. However, for chemical embossing of the foam layer 14, an inhibitor and/or accelerator must be able to interact with the foam layer 14 for the areas in which non-foaming, and/or foaming is desired.

As previously discussed, the plastisol based foam and wear layers 14, 18 are formed into a coating having the desired thickness and then heated to gel the composition to provide a suitable surface for application of the inhibitor, the print layer 16, and/or other layers or coatings. The term "gel" includes both the partial solvation to the elastomeric point of the resinous composition and complete solvation of the resin or resins with the plasticizer to fuse the layers and top coat. For example, the temperature is raised to between about 275° F. and about 325° F., preferably about 300° F., to gel the polyvinyl chloride resinous plastisol compositions.

The top coat 20 may then be applied over the wear layer 18 to form the coated web 21. Preferably, the top coat 20 comprises a coat of a cross-linkable resinous composition, such as a cross-linkable polyurethane, epoxies, melamines, and other cross-linkable resins. Thermoplastic resins, such as thermoplastic polyurethane and acrylics can also be employed. The top coat 20 is applied by another conventional coating apparatus 28 such as a reverse roll coater, a doctor blade, an air knife, or other similar coating apparatus to form a coated web. Similar to the wear layer 18, the top coat 20 can be transparent, translucent, or pigmented opaque and, preferably, has a substantially uniform thickness across the wear layer 18. Again, if the top coat 20 is opaque, the inks will not be visible from the surface of the mechanically and chemically embossed surface covering 10.

The coated web 21 is then passed through a fusion oven 40 to fuse, cure, and expand the coated web 21, thereby forming a surface covering 11. The fusion oven 40 can be any heating apparatus such as a hot air impingement oven or infrared heat lamps. Preferably, the fusion oven 40 heats both surfaces of the coated web 21. The fusion oven 40 raises the temperature of the resinous compositions on the substrate 12 high enough to sufficiently cause the selective decomposition of the blowing agent contained in the foam layer 14 and to completely solvate and fuse all resinous layers on the substrate 12. If the substrate 12 comprises a resinous composition, the substrate 12 is fused to an adjacent resinous layer, such as the foam layer 14. The cellular foam areas not in contact with, or exposed to, any inhibitor composition can reach their maximum expansion or blow. The portion of foam layer 14 in contact with any area or composition having a concentration of inhibitor will have little or no foam structure or expansion. However, as indicated above, those foam areas exposed to a portion of the print layer 16 having smaller concentrations of inhibitor can have more foam structure or expansion than those areas having a greater concentration of inhibitor.

Upon exiting the fusion oven 40, the surface covering 11 is tempered to at least a temperature where the surface covering 11 resists blistering or separation between the substrate and layers thereof upon application of an external stress, such as a mechanical embossing procedure. Tempering is accomplished in the present invention by temperature reduction of the surface covering. This is particularly important since any premature handling of the surface covering 11 immediately after foaming might cause partial collapse and distortion of the foam structure.

Preferably, the surface temperature of the PVC plastisol wear layer overlying the foamed regions is reduced to about 240° F. or below and the wear layer overlying the non-foamed regions is maintained above about 240° F. However, these temperature ranges can vary significantly depending upon the temperature required to substantially liquefy either the wear layer or top coat overlying the nonfoamed regions, as well as the temperature gradient difference between the foamed and nonfoamed regions. For example the temperature gradient differences between the foamed and non-foamed regions may be such that the surface temperature of the wear layer and top coat overlying both regions may be the same. The term "substantially liquefy" or "substantially fluid" is meant to include any state in which either the wear layer or top coat can be mechanically embossed with a surface texture and that such texture is capable of being set into either the wear layer or the top coat upon the cooling of the surface covering by the embossing roll. Of course, the exact ranges of temperatures will also vary depending upon the composition comprising either the wear layer or top coat.

Tempering the surface covering to the desired temperature reduces energy demands by forgoing an additional heating step before mechanical embossing. Thus, this embodiment permits a continuous process which reduces handling requirements by the manufacturer, and reduces space requirements for either storage or process line length. In another embodiment, the chemical embossed surface covering is cooled to ambient conditions and subsequently reheated, temperature gradients adjusted, and mechanically embossed resulting in the same desired effect.

Tempering can be accomplished through various methods such as by allowing the surface covering to sufficiently cool to the desired temperature through atmospheric radiant heat transfer as it moves along the process line prior to engaging any device following the fusion oven. A blowing device (not shown), such as a fan or an air conditioning unit, may be employed to assist in this tempering technique. Preferably, a tempering unit 42 is utilized to temper the surface covering. Depending upon line speed, surface covering composition, and surface covering temperature exiting the fusion oven 40, a conventional back wetter 46 may be included.

As illustrated, the tempering unit 42 can comprise at least one surface cooled tempering roller 44 having a relatively smooth contact surface. The tempering unit 42 has two water-cooled, chrome-plated steel tempering rollers 44. The tempering rollers 44 are preferably to only come in contact with the wear layer or top coat which resides over the foamed portions of the surface covering. FIG. 1 illustrates the tempering rollers 44 positioned so that the surface covering 11 is fed through the tempering rollers in an "S" configuration and passes around and is maintained in contact with between from about 180° to about 200° of the circumference of each tempering roller 44 (about 180° to about 200° of wrap). In this configuration, the substrate 12 of the surface covering 11 initially contacts one tempering roller 44, and the other tempering roller 44 contacts the top coat 20 residing over the foamed regions of the surface covering. Preferably, the tempering roller in contact with the wear layer will be significantly cooler than the tempering roll in contact with the substrate.

To avoid incidental mechanical embossing of the top coat 20, the tempering roller 44 contacting the top coat 20 should have a surface roughness no greater than 32 microinch ($10^{-6}$ inch) root-mean squared (32 RMS). The surface smoothness of the tempering roller 44 contacting the substrate 12 is not as critical. Clearly, the tempering rollers 44 can have any desired outside diameter, more than two tempering rollers 44 may be utilized, and the amount of wrap about the tempering rollers 44 can be more or less than that mentioned above.

In a further embodiment, the surface covering can be heated by a heater 50 which rapidly heats the top coat 20 after tempering. Importantly, the top coat 20 residing over the nonfoamed regions should be heated to a sufficient degree to allow it to be mechanically embossed without fracture, cracking, or structural failure, such as de-lamination. That is, the top coat 20 is heated to a sufficient temperature for a sufficient time in order to soften or even further soften the top coat 20.

The amount of heat (if any) to be applied and the duration of such application depends upon, among other things, the temperature gradient of the surface covering 11 exiting the tempering unit 42, the composition of the top coat 20, the thickness of the top coat 20, the speed of the moving surface covering 11, the color of the printed design under the wear layer 18 surface, and the color of the resinous layers. To further enhance heating of the top coat 20, the resinous layers can comprise a resin or contain agents which absorb energy from a desired frequency of the infrared spectrum.

Optionally, the high temperature heater 50 may be a burner, such as a gas burner. One example is the "Blu-Surf" burner sold by the Blu-Surf Division of Hayes-Albion Corporation of Parma, Mich. This is a burner which operates with a very short flame coming off an air-gas manifold. The hot gases from the flame are directed by a nozzle structure towards the top coat of the surface covering.

Preferably, the high temperature heater 50 comprises a bank of infrared heaters. Suitable infrared heaters are 10.1 kW RADPLANE SERIES 81 infrared heaters manufactured by Glenro, Inc., Patterson, N.J. The high temperature heater 50 should extend beyond the respective edges of the surface covering 11 to assist in heating the portions of the top coat 20 proximate the edges. Top coat edge temperature and heating are further discussed below.

In a further embodiment, the surface covering is heated from the backside. The backside of the surface covering is that side having the exposed substrate or the side opposite the applied top coat or wear layer. Heat is applied to the backside of the surface covering to create a temperature gradient such that the substrate has a temperature which is greater than the top coat or wear layer of the surface covering. The temperature of the substrate is such that there is a difference in wear layer/top coat temperature gradient overlying the foamed and non-foamed regions. By heating the backside of the surface covering, varying degrees of temperature gradient can be achieved in the top coat, since the foamed regions have an insulation value which retards the transfer of heat from the heated substrate to the top coat overlying the foamed regions. The reverse is true for the top coat overlying the nonfoamed regions, where heat can be more directly transferred to the top coat overlying the nonfoamed regions.

The backside of the surface covering can be heated by any conventional means described above. Such means can include, but is not limited to, passing the backside of the surface covering over a heated drum conventionally used in the surface covering industry. Additionally, infrared heaters or other heat sources may be utilized.

Mechanical embossing can comprise a conventional engraved steel embossing roll 54 and a back-up roll 56. Preferably, the embossing roll 54 is water cooled and servo-driven, and the back-up roll is a steel back-up roll 56. Upon engaging the embosser nip 52, the steel back-up roll 56 contacts the substrate 12 and the embossing roll 54 contacts the hot top coat 20 of the surface covering 11.

Preferably, the embossing roll 54 has substantially the same temperature across its surface. This contact with the cooled embossing roll surface removes heat from the top coat 20 of the surface covering 11 by heat transfer from the surface covering 11 to the water-cooled, steel embossing roll 54, and thus "sets" the embossing substantially in the nonfoamed regions of the surface covering, such as in the grout lines. In addition to setting the embossed texture substantially in the nonfoamed regions, a differential gloss pattern is also set onto the top coat or wear layer. The level of gloss is lower in the embossed regions than in the non-embossed regions or the foamed regions. Dwell time of the surface covering on the embossing roll 54 is dependent on exact embossing roll circumference, wrap, and line speed, which can be determined by one skilled in the art.

The embosser nip 52 or gap can float against a fixed pressure or, preferably, be adjustably fixed. Adjustment to the embosser nip 52 can be made, for example, by adjustable steel wedge blocks (not shown) or, preferably, by a jack screw (not shown). However, when the embosser nip 52 is fixed, consistent caliper of the surface covering 11 prior to entry into the mechanical embossing section of the process needs to be monitored and maintained.

During mechanical embossing, the embossing roll 54 can be bottomed out against the top coat surface. Not only the raised areas, but also the depressed areas of the embossed pattern on the embossing roll 54 substantially engage the top coat 20 of the surface covering 11. Consequently, both the raised and depressed areas of the embossing roll 54 can initially provide a pattern effect directly on both the foamed and nonfoamed regions of the top coat 20 of the surface covering 11. However, upon the setting of the surface texture, only the texture that has been embossed over the nonfoamed regions sets substantially.

The mechanically and chemically embossed surface covering 10 then passes to a tension control device 60, such as a dancer structure, a load cell roll, and the like, which maintains tension control in the process line, particularly the mechanical embossing section. At about this point, the mechanically and chemically embossed surface covering 10 has been cooled to between approximately 75° F. and approximately 100° F. (ambient temperature). The mechanically embossed texture is then set substantially over the nonfoamed regions of the surface covering. Of course, varying degrees of texture can also be applied and set onto the foamed regions, but such a texture would not be set onto the foamed regions with the same degree as the texture set onto the nonfoamed regions.

The following examples are intended to illustrate the invention and it is thought variations will occur to those skilled in the art. Accordingly, it is intended that the scope of the invention should be limited only by the appended claims.

EXAMPLES

Example 1

In Example 1, there is illustrated a mechanically and chemically embossed surface covering having a wear layer which is mechanically embossed predominantly over the non-foamed regions.

A felt substrate having a thickness of approximately 10 mils was coated with a substantially uniform coat of a polyvinyl chloride HMC (hot melt calendered) layer having a depth of approximately 25 mils and applied by a calender. The substrate and HMC layer were tempered to approximately 75° F. An expandable foam layer of a polyvinyl chloride plastisol containing a blowing agent is applied with a blade coater. The expandable foam layer has a wet applied average thickness of about 10 mils.

Thereafter, the expandable foam layer was gelled to a relatively firm condition by heating the foam layer to a temperature of approximately 300° F. for approximately 6 seconds. In this example, the foam layer was heated without expanding the foam layer. A print ink composition containing an inhibitor composition was printed and dried on the gelled expandable foam layer by a conventional rotogravure printing apparatus to form a print layer. The print layer may be printed in a grout pattern design.

A clear, non-foaming polyvinyl chloride plastisol wear layer having an applied thickness of approximately 10 mils was then coated onto the print layer by a blade coater to form the coated web. The coated web was passed through a fusion oven at a temperature of approximately 400° F. for approximately 50 seconds to expand and cure the foam layer, cure the wear layer, cure the top coat, and fuse all resinous layers to form a surface covering. The portions of the foamable layer in contact with the grout-printed pattern of the print layer do not expand, thereby chemically embossing the printed pattern into the foam layer. Upon exiting the fusion oven, the surface covering was tempered by passing the surface covering in an "S" configuration between two water cooled tempering rollers, with a wrap on each tempering roller of approximately 180°. The line conditions were such that the surface of the nonfoamed regions or the grout/down areas made minimum or no contact with the tempering rollers. The temperature of the tempering rollers is controlled to provide a top surface temperature of about 255° F. and a bottom temperature of about 292° F.

Subsequently, the surface covering entered the embosser nip. The embosser nip was formed by the water-cooled, chrome-plated steel embosser roll having an overall pattern on the surface thereof and the chrome plated steel back-up roll, with a gap of approximately 42 mils. Upon entering the embosser nip, the pattern of the embossing roll mechanically came in contact with the surface of the product. The temperature profile and heat transfer properties of the product were such that embossing only occurs in the wear layer surface overlying the nonfoamed regions or grout regions. The embossing roll surface temperature is maintained at approximately 80° F., thereby setting the mechanically embossed pattern and forming the mechanically and chemically embossed surface covering.

Additionally, the temperature of the wear layer surface exiting the IR oven can be raised, or the line speed can be decreased (longer dwell time/more heat transfer) to add some degree of texturing to the foamed regions or the up areas. But the majority of the texturing still occurs in the nonfoamed regions.

Upon cooling to ambient temperature, the mechanically and chemically embossed surface covering was found to be acceptably and permanently embossed in the grout regions.

Example 2

In Example 2, there is illustrated a similar process as illustrated in Example 1, except a top coat was further applied to the mechanically and chemically embossed surface covering having a wear layer.

The top coat of a cross-linkable polyurethane-melamine resin having a wet applied thickness of approximately 1 mil was coated onto the gelled wear layer by a reverse roll coater to form a coated web. The coated web was processed similar to that in Example 1. The line speed and heating profiles were controlled similar to that in Example 1, resulting in a final product structure having a top coat embossed only in grout regions.

Example 3

A flooring product of similar composition to that of Example 1 is processed through the same process as described, except that radiant heaters 50' are positioned under the backing so that heat is applied to the product from the back side. Heat is thermally conducted through the construction such that the surface temperature of wear layer overlying the nonfoamed (chemically embossed down) regions rises faster than the surface temperature of the wear layer overlying the thermally insulating foamed (chemically embossed up) regions. When the temperature of the wear layer overlying the nonfoamed regions reaches an embossable, fluid state, the product is passed through the embossing nip (overall patterned embossing roll). The resultant product upon cooling exhibits a textured grout (down) region with no texture on the up regions. If radiant heat is also simultaneously applied to the top surface, the conditions of the process can be varied such that a slight or different texture is obtained on the up areas while a strong texture is obtained in the grout regions.

Example 4

The backing layer of a chemically embossed flooring product of similar composition to that of Example 1 is brought into contact with a heated drum after the tempering rolls. The drum is configured with an overall patterned embossing roll down stream from where the flooring product makes first contact with the drum. The temperature and dwell time on the drum is adjusted such that the temperature of the wear layer over the nonfoamed (CE down) regions rises and reaches an embossable fluid state, and the temperature of the wear layer over the foamed (CE up) regions does not rise sufficiently to reach an embossable state.

Subsequently, the product is contacted by a mechanical embossing roll similar to that in U.S. Pat. No. 5,961,903, which textures the surface of the grout (CE down) regions while not texturing the other surfaces of the product. The resulting visual effect is that of a lower gloss-textured grout region that realistically simulates a grouted ceramic tile visual. Radiant heat can be added to the surface to provide the ability to strongly texture the grout regions and slightly texture the wear layer overlying the foamed regions.

While specific embodiments have been set forth as illustrated and described above, it is recognized that variations may be made with respect to disclosed embodiments. Therefore, while the invention has been disclosed in various forms only, it will be obvious to those skilled in the art that many additions, deletions and modifications can be made without departing from the spirit and scope of this invention, and no undue limits should be imposed except as set forth in the following claims.

What is claimed is:

1. A method of manufacturing an embossed surface covering comprising:
   forming a surface covering comprising a wear layer overlying a foam layer, said foam layer having a foamed region and a substantially non-foamed region;
   adjusting the temperature of the formed surface covering such that a temperature gradient exists laterally across the wear layer between the region of the wear layer substantially overlying the foamed region and the region of the wear layer substantially overlying the non-foamed region; and
   thereafter, mechanically embossing the wear layer whereby a surface texture is set predominantly into the wear layer substantially overlying the non-foamed region.

2. The method of claim 1, wherein the foamed region and non-foamed region are selectively disposed in accordance with a predetermined pattern.

3. The method of claim 1, wherein the surface covering further comprises a substrate underlying the foam layer and a chemical foaming inhibitor or activator is selectively disposed proximate the foam layer.

4. The method of claim 1, wherein the surface temperature of the wear layer substantially overlying the non-foamed region is higher than the surface temperature of the wear layer substantially overlying the foamed region prior to the mechanical embossing step.

5. The method of claim 1, wherein the surface covering has a back-side opposite the wear layer and the surface temperature of the back-side of the surface covering is higher than the surface temperature of the wear layer prior to the mechanical embossing step.

6. The method of claim 5, wherein heat is applied to the back-side of the surface covering to adjust the temperature gradient.

7. The method of claim 6, wherein the back-side of the surface covering is heated with a heated drum.

8. The method of claim 6, wherein the back-side of the surface covering is heated such that the wear layer substantially overlying the non-foamed region is substantially fluid and the wear layer substantially overlying the foamed region is not substantially fluid.

9. The method of claim 1, wherein the temperature gradient is adjusted by tempering the surface covering before the mechanical embossing step.

10. The method of claim 9, wherein the surface covering is tempered with a smooth surfaced roll.

11. The method of claim 10, wherein the smooth surfaced roll engages the wear layer predominantly overlying only the foamed region of the surface covering.

12. The method of claim 1, wherein the surface covering is cooled to ambient temperature before adjusting the temperature gradient.

13. The method of claim 1, further including heating the wear layer of the surface covering before the mechanical embossing step.

14. The method of claim 1, further comprising mechanically embossing a surface texture into the wear layer predominantly overlying the foamed region such that the set surface texture overlying the foamed region is different than the set surface texture overlying the non-foamed region.

15. The method of claim 14, wherein surface texture is set into the wear layer overlying the foamed region to a lesser extent than the surface texture set into the wear layer overlying the non-foamed region.

16. The method of claim 14, wherein the surface texture is achieved with an embossing tool having a plurality of regions of different texture.

17. The method of claim 14, wherein a surface texture is mechanically embossed into the wear layer substantially overlying the foamed region and into the wear layer substantially overlying the non-foamed region in separate processing steps and wherein a first temperature gradient is established prior to a first mechanical embossing step and a second temperature gradient is established prior to a second mechanical embossing step.

18. The method of claim 3, wherein the substrate further comprises a melt processed resin layer.

19. The method of claim 18, wherein the melt processed resin layer is hot melt calendered.

20. The method of claim 18, wherein the melt processed resin layer comprises a resin selected from the group consisting of polyvinyl chloride, polyethylene, polypropylene, polystyrene, metallocene polyolefin, and copolymers thereof.

21. The method of claim 1, wherein the wear layer is a plastisol or an organosol composition comprising a resin selected from the group consisting of a homopolymer of polyvinyl chloride, a copolymer of polyvinyl chloride, and combinations thereof.

22. The method of claim 1, wherein the wear layer comprises a melt processed resin layer.

23. The method of claim 22, wherein the melt processed resin layer comprises a resin selected from the group consisting of a polyvinyl chloride homopolymer, a polyvinyl chloride copolymer, a polyamide, a polyester, a polyolefin homopolymer, a polyolefin copolymer, an acrylic resin, and combinations thereof.

24. The method of claim 1, wherein the foam layer comprises a plastisol or organosol composition comprising a resin selected from the group consisting of a homopolymer of polyvinyl chloride, a copolymer of polyvinyl chloride, and combinations thereof.

25. The method of claim 1, wherein the foam layer comprises a melt processed resin.

26. The method of claim 25, wherein the melt processed resin layer comprises a resin selected from the group consisting of a polyvinyl chloride homopolymer, a polyvinyl chloride copolymer, a polyamide, a polyester, a polyolefin homopolymer, a polyolefin copolymer, an acrylic resin, and combinations thereof.

27. The method of claim 1, wherein the wear layer substantially overlying the non-foamed region has a lower gloss value than the gloss value of the wear layer substantially overlying the foamed region.

28. The method as in any one of the preceding claims, wherein the wear layer is a composite layer comprising a plurality of strata and wherein the uppermost strata comprises a topcoat.

29. The method of claim 2, wherein the wear layer is a composite layer comprising a plurality of strata and wherein the uppermost strata comprises a topcoat; and wherein the topcoat comprises a cross-linked resinous composition.

30. A method of manufacturing an embossed surface covering comprising:

forming a web comprising a substrate, a foamable layer, and at least one chemical foaming inhibitor or activator composition disposed proximate the foamable layer in accordance with a predetermined pattern;

coating the web with a composite wear layer comprising a plurality of strata including an uppermost strata comprising a cross-linkable topcoat;

heating the composite wear layer coated web to a temperature at which the wear layer is cured and the foamable layer is selectively expanded such that the foamable layer forms a foam layer having a foamed region and a substantially non-foamed region in accordance with the predetermined pattern;

adjusting the temperature of the wear layer coated expanded web such that a temperature gradient exists laterally across the wear layer between the region of the wear layer substantially overlying the foamed region and the region of the wear layer substantially overlying the non-foamed region; and thereafter, mechanically embossing the wear layer whereby a surface texture is set predominantly into the wear layer substantially overlying the non-foamed region.

* * * * *